Feb. 25, 1941.  C. S. ACKLEY  2,232,898
METHOD OF SOLIDIFYING POROUS EARTH MATERIALS
Filed April 22, 1937

INVENTOR
Charles S. Ackley
BY
HIS ATTORNEY

Patented Feb. 25, 1941

2,232,898

UNITED STATES PATENT OFFICE 2,232,898

METHOD OF SOLIDIFYING POROUS EARTH MATERIALS

Charles S. Ackley, New York, N. Y.

Application April 22, 1937, Serial No. 138,360

6 Claims. (Cl. 61—36)

This invention relates to a method of solidifying porous earth materials, accomplished, usually, while such materials are in their natural undisturbed locations by the injection therein of a filling and bonding medium.

The present application is a substitute for and continuation in part of my copending application Serial No. 64,357, filed February 17, 1936, and entitled Method of solidifying sandy soils.

Many instances arise where loose and porous earth materials, particularly in their natural undisturbed locations at or below the surface of the earth, present problems of instability of structure when subjected to the operations of excavating for the foundations of buildings, the boring of tunnels, the sinking of mine shafts, and the accomplishing of many like phases of construction work, or when relied upon to support the load of buildings or other structures. Also, substrata of such earth materials may provide channels for flow of underground streams, undesirable in many locations.

By practice of the present invention, unstable porous earth materials, as for instance sands, fractured rock, friable soils, whether in a dry, or a moist, or a flooded state are rendered hard and compact, conglomerated for all practical purposes into a solid mass having a compressive strength and a resistance to the disintegrating attack of natural corrosive forces, equal or superior to concrete or like composition building materials. The method is especially adapted for application to loose, porous earth materials in their natural undisturbed locations at or below the surface of the earth for the formation of solid earth structure adequate as a foundation for building construction or as a retaining wall, core wall or the like.

Fundamental to the method is the employment, as the filling and bonding medium, of a material of the nature of sulphur, and preferably native sulphur or a material having a high sulphur content, in a molten state characterized by a high degree of fluidity.

A comparatively low melting point, and an extremely low degree of viscosity—in certain of its molten states a viscosity comparable to that of water, and a specific gravity almost twice that of water, resulting in remarkable mobility and great penetrating powers—are characteristics of sulphur particularly adapting it for introduction into porous earth materials for extended and positive diffusion throughout the tenuous pore passages thereof. Rapid hardening, tenacity as a binder when solidified, and inherent resistance of the solidified form to the disintegrating effect of corrosive soil waters are properties of sulphur rendering it especially effective in the formation of hard, firm earth conglomerates of high compressive strength suitable for the purposes above specified. Characteristics and properties of the native sulphur may be slightly modified in certain cases to suit particular conditions by the addition of various qualifying materials. The specification of "sulphur", hereinafter, refers to native sulphur, material predominantly of sulphur content, or material possessing the physical characteristics of sulphur effective in this method.

The physical characteristics necessarily possessed by any material for rendering it capable of effective use in the method are relatively great fluid mobility when heated, and comparatively hard solidity when cooled.

Introduction of the molten sulphur to the earth materials to be solidified is accomplished by a process of injection under pressure, preferably through suitable piping jetted or driven from the surface of the earth to the particular subsurface location concerned. The porous earth materials may be pre-conditioned by the introduction of steam or other heat supplying medium, under pressure, for diffusion throughout the pore passages prior to the introduction of the molten sulphur. Where there is sufficient natural water content in the porous earth materials, as in the case of quicksand or underground water courses, the molten sulphur introduced thereinto may itself generate sufficient steam to accomplish the preconditioning without resort to a supplied heating medium.

For accomplishing efficient diffusion of the heating medium, irrespective of how generated, throughout the pore passage of the area of porous earth materials to be solidified, and for providing definite control of the extent of diffusion of the molten sulphur, suitable well points or the like may be driven at spaced locations substantially surrounding the injection pipe or pipes for defining the boundary of, and predetermining, the zone to be treated. By any well known pumping means a condition of suction may be created in the well points during the introduction of steam, hot water, or other heating medium and/or molten sulphur, for effecting pre-heating of the porous earth materials and diffusion of molten sulphur throughout the pore structure thereof rapidly and positively within the zone bounded by the suction piping. Any cold water naturally present in the zone undergoing treatment and in the earth surrounding that zone will be drawn toward and into the suction piping, as will also be injected molten sulphur. Contact of the molten sulphur with the cold water, drawn from the earth materials surrounding the zone, effects at the boundary of the zone substantially instantaneous hardening of the molten sulphur, thus defining the outward limits of the extent of diffusion thereof through the earth materials concerned.

Gradual raising of the injection pipe, and of the suction pipes, if employed, during the injection of steam and/or molten sulphur will effect progressive building of solid structure vertically upward to the desired location near or at the surface of the earth.

Figure 1:
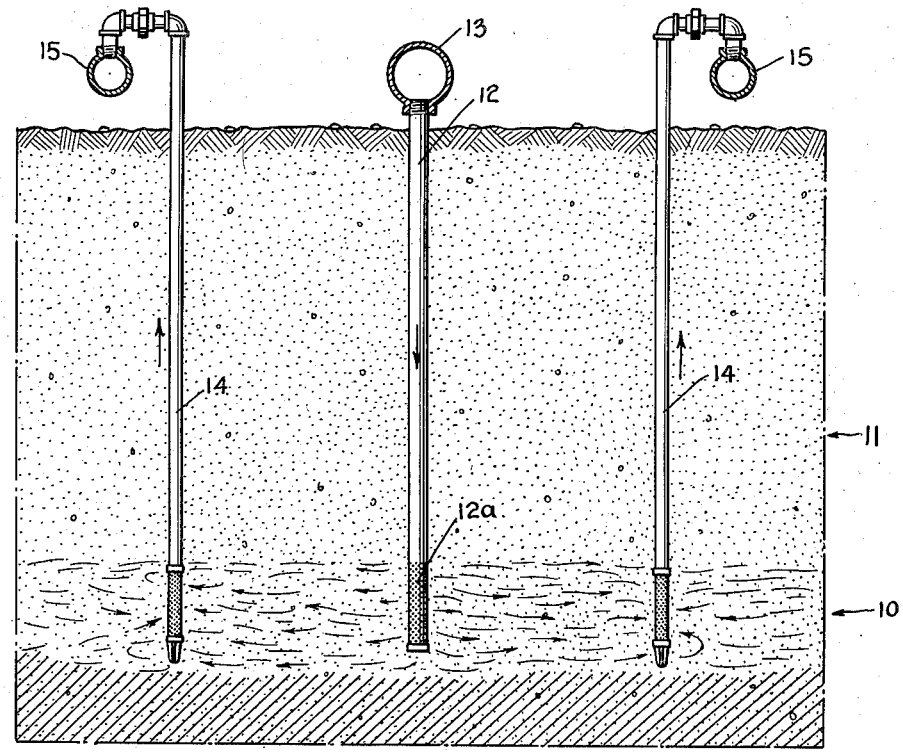
Fig. 1 represents a view in vertical section, taken on the line I—I, Fig. 2, of a portion of the earth's surface layer, illustrating a condition of sub-surface stratum of porous earth susceptible of treatment by the method of this invention. One embodiment of means for practicing a preferred procedure of the method is illustrated.

Referring to the drawing: at 10 is indicated a stratum of porous earth material such as sand, fractured rock, or the like with or without the presence of natural soil water, and susceptible of solidification pursuant to the present invention. The overburden, indicated at 11, may be of any earth material; as illustrated, however, it comprises material of a type permitting passage of well points.

Figure 2:
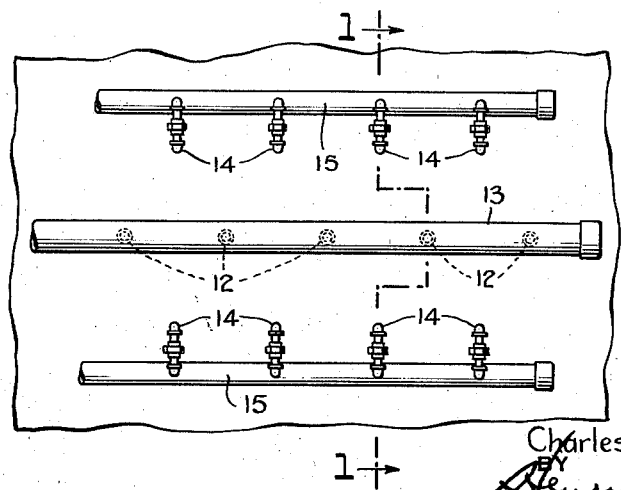
Fig. 2 represents a plan view on a reduced scale of a fragment of the structure illustrated in Fig. 1.

In carrying out the method, injection pipes 12 each having a perforated end 12a may be jetted, or otherwise driven, at intervals through the overburden 11 to the desired depth in the sub-stratum 10 of porous earth material to be solidified. The injection pipes 12 may tap a common supply pipe 13, see Fig. 2.

Under certain conditions, usually where the earth stratum 10 is substantially free from natural soil water, steam or other heating medium is first supplied to the piping 13 under pressure from any suitable source. Discharge of such steam or other heating medium through the perforated ends 12a of the injection pipes 12 accomplishes diffusion of same throughout a considerable zone of the stratum 10 adjacent the stated perforated ends 12a, pre-heating the earth materials in passage through the porous structure thereof. The duration of pre-heating will depend upon the particular earth conditions dealt with.

Thereafter, molten sulphur in a state of high fluidity, is supplied to the pipe 13 under pressure from any suitable source. Discharge of the molten sulphur will take place through the perforated ends 12a of the injection pipes 12 for accomplishing diffusion of same throughout the pre-heated zone.

While the most advantageous use of sulphur is had in its molten status at a temperature between its melting points, i. e. 112.8° centigrade and 119.0° centigrade, and 160 degrees centigrade, at which a high degree of fluidity and great penetrating powers are attained, and at which sulphur may be applied pursuant to the instant invention most practically, it is within the scope of the invention to utilize sulphur in any of its molten states affording substantially free flow thereof, as for instance between the temperatures of 230 degrees and 444 degrees centigrade, the latter being the boiling point.

Where there is an excess of natural soil water in the earth stratum 10, as in the case of quicksand or an underground water course, the step of pre-heating by artificially supplied means may be, but is not necessarily, dispensed with. The molten sulphur introduced into the natural soil water will generate sufficient steam to effectively accomplish the purpose. Under such conditions, it is desirable that a comparatively limited supply of molten sulphur be preliminarily introduced to effect steam generation and steam diffusion for the pre-heating purposes. This limited supply of molten sulphur is then followed by the normal full flow, preferably with an intervening time period of a duration dependent upon the particular characteristics of the zone being treated, until the extent of impregnation desired, has been accomplished.

The pressure under which both the pre-heating medium and the molten sulphur is injected into the porous earth materials is determined by the extent of impregnation desired, and any special requirements of the particular application.

For controlling and enhancing diffusion of both the pre-heating medium, if supplied, and the molten sulphur throughout the porous earth materials, and for dewatering purposes, suction may be created at locations defining the boundary of the zone to be impregnated and solidified, the molten sulphur being injected within the zone so bounded. Well points 14, driven through the overburden 11 to substantially the same depth in the earth stratum 10 as the depth of the injection pipes 12 and substantially surrounding the latter, may tap vacuum piping 15 connected to any suitable suction pump.

Creation of suction in the well points 14 enhances the rate of flow of the pre-heating medium and/or the molten sulphur toward the perforated ends of such well points, as well as accomplishing dewatering of the zone under treatment. Any natural water present in the earth surrounding the predetermined zone will be drawn toward the perforated ends of the well points 14 in a direction opposite to the flow of sulphur. Contact of cold natural water and the molten sulphur at the boundaries of the pre-determined zone will result in rapid hardening of the molten sulphur thereat to define the limits of the extent of sulphur diffusion, and thus the configuration of the resulting solidified earth structure.

For the formation of solidified earth structures having extended vertical dimensions, the well points and/or the injection pipes may be raised progressively, during the injection of the pre-heating medium and/or the molten sulphur, to the desired terminus location near or at the surface of the earth.

Whereas this invention has been illustrated and described with reference to specific instances of the practice of the method, it should be clearly understood that changes may be made from time to time as the art progresses without departing from the spirit of the invention as defined in the following claims.

I claim:

1. A method of solidifying a predetermined zone of porous earth materials, comprising introducing molten sulphur into the said zone while maintaining conditions of suction at locations substantially bounding said zone, the said conditions of suction being such as to considerably facilitate diffusion of the molten sulphur throughout said zone.

2. A method of solidifying a predetermined zone of porous earth materials, comprising introducing a heating fluid into the said zone while maintaining conditions of suction at locations substantially bounding said zone, thereafter introducing molten sulphur into said zone while maintaining the said conditions of suction, the said conditions of suction being such as to facilitate diffusion of said heating fluid throughout the zone and removal of same therefrom, and as to considerably facilitate diffusion of the said molten sulphur throughout the heated zone.

3. A method of solidifying a zone of earth materials of the nature of quicksand, comprising predetermining the zone to be solidified by creating suction within said earth materials at relatively closely spaced intervals about a substantially enclosing lateral boundary without disturbing natural conditions between mutually adjacent suction locations along said boundary, said created suction being such as to extract water from the zone so bounded and to draw soil water from without said zone to the said boundary in providing a substantially continuous wall of soil water along said boundary between mutually adjacent suction locations; and introducing molten sulphur within the confines of said boundary while maintaining the said suction.

4. A method of solidifying a zone of earth materials of the nature of quicksand, comprising predetermining the zone to be solidified by creating suction within said earth materials at relatively closely spaced intervals about a substantially enclosing lateral boundary without disturbing natural conditions between mutually adjacent suction locations along said boundary, said created suction being such as to extract water from the zone so bounded and to draw soil water from without said zone to the said boundary in providing a substantially continuous wall of soil water along said boundary between mutually adjacent suction locations; introducing a fluid heating medium substantially centrally within the confines of said boundary while maintaining the said suction; and introducing molten sulphur substantially centrally within the confines of said boundary while maintaining the said suction.

5. A method of solidifying porous earth materials containing an excess of moisture, comprising establishing locations of suction substantially bounding a predetermined zone of said porous earth materials; injecting into said predetermined zone, first, a limited supply of molten sulphur under pressure for generating steam by contact with the excess moisture, while causing suction to be effective at said locations of suction for diffusing the steam, so generated, through said predetermined zone; and following said limited supply of molten sulphur with full normal supply while maintaining suction, at said locations of suction, of such character as to be effective to facilitate diffusion of the molten sulphur throughout said zone.

6. A method of solidifying porous earth materials containing an excess of moisture, comprising establishing locations of suction substantially bounding a predetermined zone of said porous earth materials; injecting into said predetermined zone, first, a limited supply of molten sulphur under pressure for generating steam by contact with the excess moisture, while causing suction to be effective at said locations of suction for diffusing the steam, so generated, through said predetermined zone; allowing a limited period of time to pass to make said diffused steam effective to thoroughly preheat said predetermined zone; and then injecting the full normal supply of molten sulphur while maintaining suction, at said locations of suction, of such character as to be effective to facilitate diffusion of the molten sulphur throughout said zone.

CHARLES S. ACKLEY.